Figure 1:
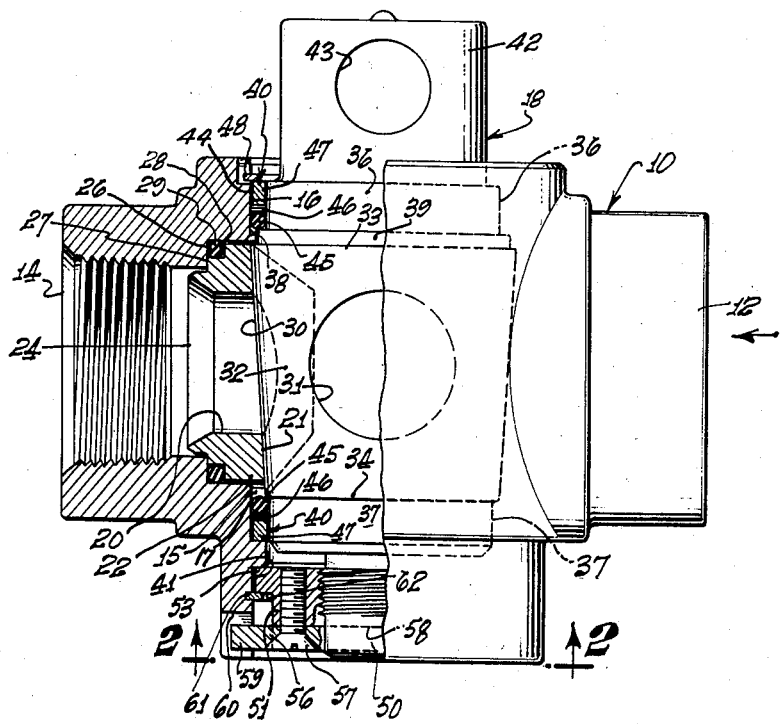

June 30, 1959  C. P. GRAHAM  2,892,610
PLUG VALVE
Filed Nov. 4, 1957

CLIFFORD P. GRAHAM,
INVENTOR.

By Spensley & Horn

ATTORNEYS

United States Patent Office 2,892,610
Patented June 30, 1959

2,892,610

PLUG VALVE

Clifford P. Graham, North Hollywood, Calif., assignor to Texsteam Corporation

Application November 4, 1957, Serial No. 694,196

7 Claims. (Cl. 251—175)

This invention relates to valves and more particularly to plug valves adapted to accommodate liquids under relatively high pressure.

Plug valves of the type well known to the art are, in general, subject to various objections in connection with the handling of fluids under relatively high pressure. The chief objections being the inability of the valve to remain fluid tight under high pressure and the difficulty in opening and closing the valve. Plug valves are, however, economical to produce, require a minimum amount of machining to fabricate, and are relatively easy to assemble. Due to such advantages numerous adaptations and changes in the standard form of plug valve construction have been made to accommodate them to high pressures and special applications.

In the prior state of the art the method of adapting the plug valve to high pressure applications has been primarily by means of the application of force against the plug to wedge and seat the plug against an accurately fitted and tapered seat. This is ordinarily accomplished by applying a spring force or line pressure against the top of the plug to force it downward against the seat. When sufficient force is applied for this purpose, however, it becomes very difficult to move the valve element from an open position to a closed position, or vice versa, due to the high frictional forces. In order to effect a sufficient seal and to lessen the forces required to turn the plug, the tapered surfaces of rotary plug valves are often lubricated under pressure, which tends to raise the plug from its seat. In such instances the valve is usually supplied with spring means for urging the plug into sealing engagement with the seat.

Thus, the prior art has relied primarily on a slight amount of endwise movement of the plug into the seat for high pressure sealing, and out of the seat for movement of the plug from one position to the other, or lubrication of the plug and seat with a continuous seating force upon the plug.

The use of springs, however, is objectionable in that the force required for high pressure operations is too great for a spring of reasonable size. In addition, the force exerted by a spring is not proportional to the load exerted by the fluid forces.

Accordingly, it is an object of the present invention to provide an improved plug valve having no endwise movement of the plug relative to the seat.

It is another object of the present invention to provide an improved plug valve in which hydraulic forces acting endwise upon the plug under high pressures are balanced.

It is a further object of the present invention to provide an improved plug valve in which the clearance between the plug and seat can be accurately regulated, adjusted, and maintained constant.

Another object of the present invention is to provide a plug valve in which the clearance between the plug and seat can be varied to compensate for wear of parts or for fluids of various viscosities and pressures to be accommodated.

The present invention provides an improved fluid valve including a valve plug element having substantially equal endwise areas whereby the fluid forces acting endwise of the plug element are balanced. Means are provided for maintaining the plug element in substantially constant endwise position. Means are also provided for adjusting the endwise position of the plug to obtain a predetermined clearance between the plug element and the valve seats.

The novel features which are believed to be characteristic of the invention, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 2:
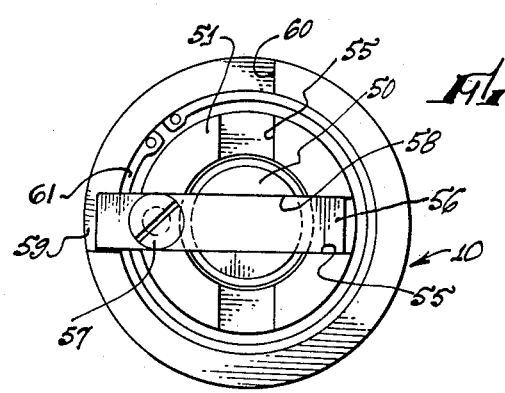

Figure 1 is a partial sectional view in elevation of a presently preferred embodiment of a plug valve in accordance with this invention; and Figure 2 is a view taken along line 2—2 of Figure 1.

Referring now to the drawing a plug valve in accordance with the present invention comprises a valve body 10 having an inlet port 12 and an outlet port 14 which are threaded for the coupling of fluid pipe. The valve body 10 defines a chamber 15 between the inlet and outlet openings communicating therewith and extending transversely through the valve body, i.e., substantially symmetrically about an axis which is perpendicular to the axis of the inlet and outlet ports. The chamber 15 is substantially cylindrical and extends through the body to define an opening 16 at the upper side of the body in Figure 1 and an opening 17 at the lower side of the body. The plug element 18 has a tapered side wall and is positioned within the chamber as described in detail hereinafter.

At the inner end of the inlet opening 12 and the outlet opening 14 of the body an insert is positioned in the form of a sleeve 20. The sleeve 20 at the inlet and outlet ports, together with the method of mounting and sealing therein is identical. Accordingly, only one such sleeve is shown and described in detail. The sleeve has an inner end or face 21 which is entirely within the valve chamber 15 and is spaced from the chamber wall by a projecting short portion 22 of the sleeve. The inner face 21 of the sleeve is tapered to be mateable with the surface of the plug and accordingly the projecting short portion 22 of the sleeve is greater at one side of the sleeve than at the other. Thus, the inner face 21 of sleeve 20 is circular in transverse cross-section, but defines a surface which is a circular segment of the surface of a frusto-conical section.

The sleeve 20 is reduced proximate its outer end 24 to a diameter substantially equal to but less than the inside diameter of the inlet port 12 or outlet port 14. An inwardly facing shoulder 26 is formed on the body in the inlet and outlet openings which is mateable with the outwardly facing shoulder 27 formed at the point of reduced diameter of the sleeve. A second shoulder 28 is provided on the sleeve so as to define a circumferential packing groove between the body and the sleeve. Disposed in the groove is a mateable resilient pressure deformable packing ring 29 known in the art as an O-ring. The O-ring thus seals the line of contact between the outside of the insert and the valve body.

The plug element 18 is positioned within the chamber 15 such that the tapered side wall 30 of the plug is mateable with the face 21 of the insert 20. The contact surface between the insert face and the side wall of the plug may be lapped and ground to insure a fluid tight fit. It should be noted that the valve plug 18 seats only against the edge or face 21 of the insert 20 and does not come into contact with the valve body within the chamber 15. The plug valve element 18 is designed to move through an angle of 90° between the open and closed position of the valve. As shown in Figure 1, the valve is in the closed position with the opening through the plug element being indicated as the circular aperture 31.

Referring now particularly to Figure 1, the plug valve element 18 is substantially symmetrical about an axial centerline which is substantially perpendicular to the longitudinal centerline through the inlet and outlet openings of the valve body. The plug element 18 includes the tapered plug portion 32 of substantially frusto-conical configuration with an upper or greater diameter 33 in Figure 1 substantially equal to but less than the diameter of the chamber 15 in the valve body. The lower diameter 34 is less than the upper diameter by an amount determined by the taper of the side wall 30 of the plug, which may be determined for optimum conditions by one skilled in the art in view of the description herein. The height of the plug portion 32 of the valve element 18 is sufficient to span the opening through the insert 20 and to provide a fluid tight seal between the side wall 30 and the face 21 of the insert. In this embodiment, the height of the tapered plug portion is approximately equal to the largest diameter of the insert. Extending upward in Figure 1 from the greater diameter 33 of the plug portion and downward from the lesser diameter are cylindrical sealing portions, or extensions, 36 and 37 respectively of the valve element 18. The sealing portions 36 and 37 are within the cylindrical chamber 15 of the valve body and are of substantially equal diameter, which diameter is substantially less than the inside diameter of the chamber 15. Thus, the surface of the sealing portions 36 and 37 are spaced from the inside wall 38 of the chamber 15 to provide an annular space 44 into which fluid sealing means are inserted. In the present embodiment a shoulder 39 is provided above the greater diameter of the plug section which shoulder 39 has a diameter intermediate that of the sealing portion 36 and the greater diameter 33 of the plug 32 to furnish a shoulder upon which the sealing means 40 is seated. Similarly, an inwardly directed flange 41 is provided proximate the lower end of the lower sealing portion 37 to furnish a seat for the lower sealing means 40. It should be noted that in forming all shoulders on both the plug element 18 and the body 10, a substantial clearance is provided such that the plug element 18 is in contact with only the face 21 of the insert and is free to move within the chamber 15 in all horizontal directions except for such contact with the insert.

Above the upper sealing portion 36 of the plug element 18 is a stem 42 which extends above the valve body. An aperture 43 is provided through the stem for the insertion of a turning handle or the like to rotate the plug element. Other means such as flats upon the stem to which a wrench or the like can be supplied may be used to rotate the plug.

The upper and lower sealing means 40 are substantially identical but are inverted. Each includes a resilient O-ring 45 having a radial cross-section substantially equal in diameter to the width of the annular space 44 surrounding the sealing portions 36 and 37 of the plug element. The O-rings are the innermost element of the sealing means 40. A plurality of relatively thin rings 46 of rectangular cross-section with an inside diameter substantially equal to the diameter of the sealing portions and an outside diameter substantially equal to the diameter of the chamber wall 38 are positioned adjacent the O-rings. The rings are formed of deformable material such as Teflon and thus do not prevent relative movement of the plug element 18 within the valve body 10. Adjacent the deformable rings 46 is a rigid ring 47 which is preferably of a material softer than the valve body, such as brass. The rigid ring furnishes a support for the O-ring 45 and deformable ring 46 and has an inside diameter greater than the diameter of the sealing portions 36 and 37 and an outside diameter less than the diameter of the chamber wall 38. Thus, the rigid ring 47 also allows movement of the plug element 18 within the valve body 10. The optimum diameters for any given application may be readily determined by one skilled in the art, it being necessary only that sufficient movement be allowed to seat the plug element against either the inlet or outlet sleeve under all clearance conditions as described hereinafter. The sealing means 40 furnish a fluid seal between the valve body and the valve plug element 18 which is particularly advantageous under high pressure conditions. When fluid under high pressure is present in the chamber 15 the fluid will exert pressure upon the O-rings 45 causing them to be deformed and to seal the passages between the valve chamber wall 38 and the valve plug element. Since the deformable rings are in contact with both the chamber wall and plug element the rings 46 will furnish a further seal and will prevent extrusion of the O-rings and subsequent damage. At the same time, however, the sealing elements allow relative movement of the plug within the body. A snap ring 48 is positioned within a ring groove in the valve body above the upper rigid ring 47 to maintain the upper sealing element 40 in position when the valve is assembled as shown in Figure 1.

Referring now to Figures 1 and 2, extending downwardly from the lower sealing portion 37 of the plug element 18 is a cylindrical holding stem 50 positioned symmetrically about the axial centerline of the plug element 18 but having a diameter substantially less than that of the sealing portion 37 and the lower chamber opening 17. The holding stem 50 is male threaded along the greater portion of its length. The male threads of the holding stem 50 are mateable with the female threads of an orienting ring 51. The orienting ring 51 has an outside diameter greater than the inside diameter of the flange 41, but less than the inside diameter of the chamber wall 38 beneath the flange, which has the same diameter as the lower opening 17 in this embodiment. The outside diameter of the orienting ring is determined by the amount of lateral movement required of the plug element within the body and is less than the chamber diameter by an amount sufficient to allow such movement. Thus, the orienting ring 51 is in the form of a collar which is threadably mateable with the holding stem 50 of the plug element 18 and is adapted to bear upon the lower face 53 of the inwardly directed flange 41 of the valve body. Means are provided for locking the holding stem 50 and the orienting ring 51 in relative non-rotatable engagement at predetermined intervals as described more fully hereinafter. Such locking means also serves to limit the rotation of the plug element within the valve body from the open to the closed position. In this embodiment two transverse recesses 55 are provided in the lower surface of the orienting ring 51 to accommodate a movement limiting and locking bar 56 which is connected to the orienting ring by means of a bolt 57. The transverse recesses 55 are formed at right angles in the surface of the orienting ring 51 radially through the centerline thereof. A similar single recess 58 is provided in the lower surface of the holding stem 50 which can be oriented to be coextensive with a recess 55 and is also adapted to accommodate the locking bar 56. The locking bar 56 is within the valve body, but has one end 59 which extends into a 90° segmental recess 60 formed in the wall of the chamber to limit the rotation of the valve plug element 18 to 90° as described hereinafter. A lock ring 61 is positioned in a groove in the chamber wall beneath a shoulder 62 formed in the orienting ring to maintain the orienting ring in the assembled position shown in Figure 1. Thus, it may be seen that the locking bar when positioned within recesses 58 and 55 in the holding stem and orienting ring respectively locks the orienting ring and holding stem in non-rotatable engagement although the complete valve element 18 including the orienting ring is free to rotate within the 90° limit imposed by the locking bar within the segmental recess. When the orienting ring 51 and holding stem 50 are interlocked the vertical position of the plug element 18 within the chamber 15 and valve body 10 is fixed and is maintained by the orienting ring in contact with the bearing surface 53 of the flange 41 and the lock ring 61. By utilizing two perpendicular recesses 55 in the orienting ring 51 the valve plug element is adjustable by quarter turns with respect to the orienting ring and thus with respect to the valve body and inserts 20. That is, by removing the bar 56 from the orienting ring recess 55 and stem recess 58, the plug element can be rotated with respect to the orienting ring to cause the holding stem to be threaded upward or downward within the ring and change the vertical position of the plug element within the valve body. Accordingly, the clearance between the tapered plug wall 30 and the face 21 of the insert 20 is also changed. By radially orienting the recesses 55 the amount of movement of the valve plug element and the corresponding change in clearance can be accurately predetermined. For example, when 12 threads per inch are used to join the holding stem 50 and orienting ring 51 the relative rotation of the valve plug element and holding stem within the orienting ring will change the vertical position of the valve plug element within the body 10 by 0.0208 inch per one-quarter turn. With a typical taper of one inch per foot included angle on the tapered side wall of the plug the total clearance between the plug and seat will be increased or decreased, depending upon the direction of movement, by approximately 0.0017 inch per quarter turn. In one-half turn adjustment the clearance will be changed by 0.0035 inch. The holding stem 50 and orienting ring 51 are then interlocked in the relative position desired and the vertical position and clearance of the valve plug element within the body will remain constant since the valve plug element cannot move axially within the body when interlocked with the orienting ring.

In order more fully to explain the operation of a valve in accordance with this invention, its use in a high pressure fluid line will be described. With high pressure fluid flowing in the direction of the arrow, that is, from right to left in Figure 1, the excess of pressure against the plug element will cause the plug element 18 to shift from right to left until the side wall 30 seats in sealing engagement with the face 21 of the sleeve 20. As described hereinbefore the complete plug element including the orienting ring 51 which is locked thereto is free to shift laterally within the valve body. The amount of horizontal shift possible is in turn determined by the vertical adjustment. The pressure exerted upon the plug element to maintain the seal is equal to the difference in pressure between the inlet and outlet line times the cross-sectional area of the outlet line. It should be particularly noted that no vertical forces are exerted by the valve plug element on other valve elements because the effective thrust area of the plug element above the plug portion 32 is equal to the effective thrust area of the plug element below the plug portion 32.

Inasmuch as a balance of vertical fluid pressures is obtained by means of the present invention, the force required to turn the valve when pressure is present in the valve chamber is minimized. That is, no downward or wedging pressure exists to bind the plug against the valve seat. When the valve is shut off the valve passage 31 extends transversely relative to the axis of the inlet and outlet ports so that the smooth surface of the plug portion 32 seats snugly against the end face 21 of the outlet port insert and also against a corresponding face of the inlet port insert. Under these circumstances line pressure will tend to shift the valve element laterally to the downstream side of the valve establishing a fluid-tight seal between the tapered face of the plug portion 32 and the face 21 of the outlet port seat.

When the valve is rotated toward the open position, the frictional force between the face only of the insert in the outlet port and the surface of the plug portion will not be sufficient to supply any great resistance to rotation. As described hereinbefore the extensions 36 and 37 are in contact with the sealing means 40, and the orienting ring 51, which rotates with the valve member, contacts the flange 41 and lock ring 61, but no substantial force tending to retard rotation arises from these contacts. In order to insure lubrication between the side wall and the face of the insert in the outlet port during rotation of the valve it is necessary to provide sufficient clearance to allow a film of liquid to be present. The clearance necessary is dependent upon the fluid in the line and valve. Thus, for optimum operation of the valve, a greater clearance is necessary for drilling mud than for crude oil, for example. As an illustration, a typical clearance between the plug side wall 30 and the faces 21 of the inserts 20 when the valve is used in a line carrying drilling mud would be 0.010 inch. Such clearance would allow leakage, however, if kerosene or a similar fluid is in the line. In such case the clearance is reduced to 0.001 inch, for example, by dropping the locking bar and rotating the orienting ring to move the plug element down the necessary distance to obtain such clearance. The predetermined adjustment of clearance is also important to compensate for wear of the valve parts through continued use.

Thus, the present invention provides an improved fluid valve which is particularly suitable for use under high pressure conditions. A valve in accordance with the present invention is hydraulically balanced such that no appreciable endwise force is exerted by the plug element and no endwise movement of the plug is required to rotate the valve. The clearance between the valve plug and seat can be accurately adjusted to a predetermined value to accommodate fluids of various viscosities and pressures and to compensate for wear.

What is claimed is:

1. A fluid valve comprising: a valve body provided with inlet and outlet ports and having a substantially cylindrical valve chamber therethrough intermediate of and in communication with said ports; ported valve seat means for each of said ports extending inwardly from said ports into said valve chamber; a rotatable valve member of smaller diameter than said valve chamber positioned within said valve chamber, said valve member having a central ported valve portion mateable with and positionable between said valve seat means, upper and lower cylindrical extensions, and a holding stem extending downwardly from said lower extension; holding means fixedly engageable with said holding stem and cooperating with said valve body for maintaining said valve member in fixed axial relationship to said valve seat means; resilient means for sealing each of the annular spaces between said upper and lower extensions and the wall of said valve chamber; and means for retaining said sealing means within said annular spaces cooperating with said valve body and including a retaining ring having an inside diameter greater than the diameter of the extension encircled by said retaining ring and an outside diameter lesser than the diameter of said valve chamber whereby said valve member is free to move laterally into sealing engagement with said valve seat means.

2. A fluid valve, as defined in claim 1, characterized in that said sealing means include a resilient O-ring positioned adjacent said valve portion and a deformable sealing ring supporting said O-ring wherein said sealing ring has a relaxed inside diameter substantially equal to the outside diameter of the extension encircled by said sealing ring and an outside diameter substantially equal to the diameter of said valve chamber.

3. A fluid valve comprising: a valve body provided with inlet and outlet ports and having a substantially cylindrical valve chamber therethrough intermediate of and in communication with said ports; ported valve seat means for each of said ports extending inwardly from said ports into said valve chamber; a rotatable valve member of smaller diameter than said valve chamber positioned within said valve chamber, said valve member having a central tapered valve portion mateable with and positionable between said valve seat means and having a passageway therethrough, upper and lower cylindrical extensions, and an externally threaded holding stem extending symmetrically downwardly from said lower extension; an orienting ring rotatably connected to said valve body in fixed axial relationship thereto, said orienting ring being provided with an internally threaded axial opening for receiving said externally threaded holding stem whereby the axial relationship of said orienting ring and said valve member may be selectively varied so as to adjust the clearance between said tapered valve portion and said valve seat means; means for fixedly engaging said holding stem and said orienting ring so as to maintain said adjusted clearance; resilient means for sealing each of the annular spaces between said upper and lower extensions and the wall of said valve chamber; and means for retaining said sealing means within said annular space.

4. A fluid valve, as defined in claim 3, characterized in that said orienting ring has an outside diameter lesser than the inside diameter of said valve chamber wherein said ring is received, and said retaining means includes a retaining ring having an inside diameter greater than the diameter of the extension encircled by said retaining ring and an outside diameter lesser than the diameter of said valve chamber whereby said valve member is free to move laterally into sealing engagement with said valve seat means.

5. A fluid valve, as defined in claim 4, characterized in that said sealing means include a resilient O-ring positioned adjacent said tapered valve portion and a deformable sealing ring supporting said O-ring wherein said sealing ring has a relaxed inside diameter substantially equal to the outside diameter of the extension encircled by said sealing ring and an outside diameter substantially equal to the diameter of said valve chamber.

6. A fluid valve, as defined in claim 4, characterized in that said upper and lower extensions have substantially identical cross-sectional areas whereby fluid forces acting upwardly and downwardly upon said valve member are balanced.

7. In a fluid valve having a tapered rotatable valve member mateable with inlet and outlet port valve seat means and positioned within a substantially cylindrical valve chamber extending through said fluid valve, the combination of: an externally threaded cylindrical holding stem extending symmetrically downwardly from said valve member provided with a single diametrically disposed recess across its base face; a circular orienting ring provided with a centrally-positioned opening therethrough said opening being internally threaded to receive said holding stem, and having two diametric recesses extending across the lower face in perpendicular relationship one to the other; means for rotatably connecting said orienting ring within said valve chamber in fixed axial relationship to said cylindrical valve chamber; a locking bar positionable within said base recess of said holding stem and within either of said orienting ring recesses; and means for removably attaching said locking bar to said orienting ring in either of said orienting ring recesses whereby said orienting ring and holding stem are fixedly engaged.

References Cited in the file of this patent

UNITED STATES PATENTS

| | | |
|---|---|---|
| Re. 24,102 | Ohls | Dec. 13, 1955 |
| 2,433,732 | Brown | Dec. 30, 1947 |
| 2,711,302 | McWhorter | June 21, 1955 |